UNITED STATES PATENT OFFICE

CARL J. OECHSLIN, OF ABLON, FRANCE

PROCESS OF PREPARING AROMATIC AMINO DERIVATIVES OF ARSINE AND THE PRODUCT THEREOF

No Drawing. Application filed March 31, 1928, Serial No. 266,461, and in France April 15, 1927.

My invention relates to a process for preparing stabilized derivatives of oxides of arsine.

The oxides of monoarylarsine and monoalkylarsine substituted or not in multiple ways in the organic part of the molecule form a class of products already known for some time in the art, but which have more particularly thrived for the past fifteen years. These products, in which the arsenic is trivalent, are more active, but also more unstable than the corresponding arsinic acids. It is well known in the art that the presence of the aminized or hydroxylized groups in the nucleus, substituted or not, increases the reactivity and instability of the group As=O to such a point that the preparation of these products in a pure state becomes difficult if not impossible.

Recent research has led me to establish that the same actions are repeated in the aliphatic series. The methyl, ethyl and propylarsine oxides are perfectly stable. Their derivatives are much less so and in certain cases even decompose spontaneously. Their isolation, therefore, remains difficult.

For these reasons, none of these oxides of arsine has found a practical use up to the present in spite of the certain valuable properties that they possess.

Researches undertaken with a view to stabilizing this product have led to the preparation of their sulphuretted derivatives, sulphides or sesquisulphides of aryl and alkylarsines, which products do not lend themselves to a practical use.

It was therefore of interest to find more stable derivatives than the oxides and at the same time to maintain the advantages thereof. This result seems to be attained in a general way by the action of oxides of arsine with sulphuretted derivatives in which a valence of sulphur is fixed at one atom of carbon.

The number of these derivatives is considerable, the substitution of the arsenic being variable as well as that of the sulphur. The ways of preparing the said derivatives are likewise variable:

Action of thiols, etc. on oxides of arsine in different solvents, in an alkaline or acid medium; action of thiols on halogenated arsines; reduction of the pentavalent arsenic of arsinic acids into trivalent arsenic in the presence of thiols, etc.; action of disulfides (S.R)$_2$ under certain conditions on the arseno derivatives or arsines.

*Example 1*

9.1 grams of oxide of aminophenylarsine (B. 43, p. 919) are dissolved in 130 cubic centimeters of normal sodium hydroxide, and the solution mixed with an ammoniacal solution of 9.1 grams of thioglycolamide. The final solution is neutralized partially and concentrated in a vacuum. Crystallization takes place and the crystals are roughly dried in the air, washed and finally dried. M. P.= 142°.

The analysis indicates the formula

$$NH_2.C_6H_4.As(SCH_2CO.NH_2)_2.$$

*Example 2*

I dissolve 9.1 grams of oxide of aminophenylarsine in normal sodium hydroxide and mix with a solution of 100 cubic centimeters of thioethanol of 7.8%. An oil is deposited whose quantity increases when the solution is neutralized. I then extract by means of ether, dry the etherized solution and evaporate in a dry vacuum which gives colorless oil, insoluble in water, soluble in ether and whose formula is

$$NH_2.C_6H_4.As(S.CH_2.CH_2OH)_2.$$

*Example 3*

I dissolve 9.1 grams of oxide of aminophenylarsine in normal sodium hydroxide and add a solution of 15 grams of potassium xanthogenate in 60 cubic centimeters of water. To the mixture is added a solution of 20 grams of ammonium chloride in 100 cubic centimeters of water. The precipitate which forms from a slow crystallization is rough dried in the air, washed and finally dried. M. P. (melting point) = 85°.

The analysis indicates the formula:

$$NH_2.C_6H_4.As(S.CS.OC_2H_5)_2.$$

Example 4

I add to an ammoniacal solution of 39.8 grams of p-hydroxy-m-amino phenylarsine oxide an alcoholic solution of 36.4 grams of thioglycolamide. The alcohol is driven out in a vacuum. An oil is deposited which crystallizes on cooling. It recrystallizes in water. This product is not very soluble in cold water, not very soluble in alcohol or ether, soluble in hot water, alkalis and acids. M. P. = 140°. The analysis corresponds to the formula:

$$m.NH_2.p.OH.C_6H_3.As(S.CH_2.CO.NH_2)_2.$$

Example 5

21 grams of oxide of p.oxy-m-acetylaminophenylarsine are dissolved in 120 cubic centimeters of normal sodium hydroxide. 21.6 grams of glycerine-monothiol, in aqueous solution of 28%, are added. I then neutralize with hydrochloric acid, filter through charcoal and evaporate in a vacuum. I then extract with alcohol, so as to separate the product from the sodium chloride and evaporate to dryness. This gives a colorless or very slightly colored oil which does not crystallize and is very soluble in water having the formula:

$$CH_3.CO.NH(OH)C_6H_3.As(S.CH_2CH(OH).CH_2.OH)_2.$$

Example 6

12 grams of oxide of p.oxy-m-acetylaminophenylarsine are dissolved in 60 cubic centimeters of normal sodium hydroxide. A solution of 15 grams of potassium xanthogenate in 60 cubic centimeters of water is added. The final solution is precipitated by weak acetic acid and the precipitate washed and dried. M. P. (melting point) = 115°. The analysis corresponds to the formula:

$$m.CH_3.CO.NH.(p.OH)C_6H_3.As(S.CS.OC_2H_5)_2.$$

Example 7

30 grams of the acid oxypropyl-diarsinic are dissolved in normal soda. I reduce cold with a slight excess of sulphurous acid and during the course of the reduction add a solution of 43.2 grams of monothioglycerine progressively. When the reduction is terminated I add 2 volumes of alcohol and allow to recrystallize for 24 hours. The crystallized sulphate is air dried and evaporated until nearly dry and the alcohol treatment repeated. I filter again, evaporate till dry and obtain a thick colorless mass which does not crystallize, is very soluble in water and has a neutral reaction. The aqueous solution of this product is stable, while that of the corresponding oxide of arsine decomposes easily. The analysis indicates the formula:

$$(CH_2OH.CH.(OH).CH_2S)_2$$
$$As.CH_2.CH(OH).CH_2.As.$$
$$(S.CH_2.CH(OH).CH_2OH)_2.$$

Another modified stabilized derivative of arsinic may be formed having the general formula:

$$(NHR^2)-C_6H_3R^1-As=(S-CH_2-CO-NH_2)_2.$$

This formula is developed as follows:

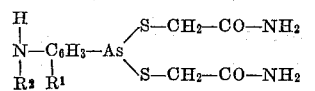

in which:

R¹ is H or OH
R² is H or CH₃CO.

Having thus described my invention what I claim as new and desire to secure by Letters Patent is:

1. The process of preparing stabilized derivatives of organic arsines which comprises adding an alcoholic solution of thiogycolamide to an ammoniacal solution of hydroxide of aminophenylarsine, driving off the alcohol and cooling the oil thus deposited to crystallize.

2. The process of preparing stabilized derivatives of arsines which comprises adding an alcoholic solution containing 36.4 grams of thioglycolamide to an ammoniacal solution containing 39.8 grams of hydroxide of aminophenylarsine oxide, driving off the alcohol and cooling the oil thus deposited to crystallize.

3. A compound slightly soluble in cold water, slightly soluble in alcohol and ether, soluble in hot water alkalies and acids and having the formula $$mNH_2pOHC_6H_3As(SCH_2CONH_2)_2.$$

4. A stabilized organic derivative of arsenic having the general formula, $$(NHR^2)-C_6H_3R^1-As=(S-CH_2-CO-NH_2)_2$$

in which

R¹ is H or OH and
R² is H or CH₃CO.

In testimony whereof I affix my signature.

CARL J. OECHSLIN.